(12) United States Patent
Oyaizu et al.

(10) Patent No.: US 8,654,039 B2
(45) Date of Patent: Feb. 18, 2014

(54) FACE PANEL FOR COLOR IMAGE DISPLAY APPARATUS, PANEL FOR COLOR IMAGE DISPLAY APPARATUS, AND COLOR IMAGE DISPLAY APPARATUS

(75) Inventors: Tsuyoshi Oyaizu, Hiratsuka (JP); Hisafumi Ebisawa, Tokyo (JP); Yukio Okudo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 56 days.

(21) Appl. No.: 13/371,611

(22) Filed: Feb. 13, 2012

(65) Prior Publication Data

US 2012/0139818 A1    Jun. 7, 2012

Related U.S. Application Data

(62) Division of application No. 12/512,206, filed on Jul. 30, 2009, now Pat. No. 8,144,080.

(30) Foreign Application Priority Data

Aug. 28, 2008    (JP) ................................. 2008-219860

(51) Int. Cl.
*G09G 3/00*    (2006.01)

(52) U.S. Cl.
USPC ................................. 345/32; 345/87; 349/106

(58) Field of Classification Search
USPC ............ 345/32, 87–89, 102; 349/56, 84, 104, 349/106
See application file for complete search history.

(56) References Cited

U.S. PATENT DOCUMENTS

| | | | |
|---|---|---|---|
| 5,898,263 | A | 4/1999 | Itou et al. |
| 5,939,821 | A | 8/1999 | Itou et al. |
| 5,989,649 | A | 11/1999 | Itou et al. |
| 6,544,326 | B1 | 4/2003 | Itou et al. |
| 6,552,486 | B1 | 4/2003 | Wani et al. |
| 2004/0218115 | A1 | 11/2004 | Kawana et al. |
| 2005/0179357 | A1 | 8/2005 | Nakao et al. |

FOREIGN PATENT DOCUMENTS

| | | |
|---|---|---|
| EP | 0 647 690 A2 | 4/1995 |
| EP | 0 647 690 A3 | 8/1995 |
| EP | 0 742 575 A2 | 11/1996 |
| EP | 0 742 575 A3 | 3/1997 |
| EP | 1 098 348 A2 | 5/2001 |

(Continued)

OTHER PUBLICATIONS

Japanese Office Action dated Feb. 19, 2013, in related Japanese Application No. 2008-219860.

(Continued)

*Primary Examiner* — Kimnhung Nguyen
(74) *Attorney, Agent, or Firm* — Fitzpatrick, Cella, Harper & Scinto (57) ABSTRACT

A display panel includes a face plate having a transparent substrate, a plurality of phosphor layers disposed on the transparent substrate for emitting different color lights, and a plurality of transmittance adjustment layers interposed between the transparent substrate and the plurality of phosphor layers. Each transmittance adjustment layer corresponds to each phosphor layer for adjusting the transmittances of the lights emitted from the plurality of phosphor layers, and the transmittance adjustment layers have a filtering function with an approximately constant transmittance in the visible light wavelength region. In addition, a rear plate has a plurality of display elements each corresponding to each phosphor layer, wherein the face plate and the rear plate are disposed so that the phosphor layers formed on the face plate are opposite to the display elements formed on the rear plate.

7 Claims, 7 Drawing Sheets

(56) References Cited

FOREIGN PATENT DOCUMENTS

| | | |
|---|---|---|
| JP | 64-007457 A | 1/1989 |
| JP | 02-100240 A | 4/1990 |
| JP | 02-121234 A | 5/1990 |
| JP | 02-174043 A | 7/1990 |
| JP | 07-179711 A | 7/1995 |
| JP | 09-027284 A | 1/1997 |
| JP | 2000-164145 A | 6/2000 |
| JP | 2001-167712 A | 6/2001 |
| JP | 2004-247166 A | 9/2004 |

OTHER PUBLICATIONS

Decision on Refusal dated Oct. 8, 2013, in Japanese Application No. 2008-219860.

FACE PANEL FOR COLOR IMAGE DISPLAY APPARATUS, PANEL FOR COLOR IMAGE DISPLAY APPARATUS, AND COLOR IMAGE DISPLAY APPARATUS

This application is a divisional of application Ser. No. 12/512,206, filed on Jul. 30, 2009.

BACKGROUND OF THE INVENTION

1. Field of the Invention

The present invention relates to a face panel for a color image display apparatus, a panel for a color image display apparatus using the face panel, and a color image display apparatus on which the panel is mounted.

2. Description of the Related Art

It is difficult for a conventional image display apparatus using a Cathode Ray Tube (CRT) called a Braun tube to cope with requirements for an enlargement of a display screen due to its weight, a technical problem for an increase of size of the CRT, and the like. Accordingly, image display apparatuses using a flat panel called Flat Panel Display (FPD) are predominantly used as image display apparatuses at present. Furthermore, liquid crystal displays, a plasma displays, and the like are mainly used as image display apparatuses using FPD.

However, since the liquid crystal display and the plasma display are partially inferior to the conventional image display apparatus using a cathode ray tube (CRT) called a Braun tube in image quality and a response speed, they are required to further improve them.

There is a field emission display (FED) having the same operation principle as that of the CRT to improve the image quality and the response speed of the FPD.

There are characteristics of brightness of a displayed image as important characteristics of a color image display apparatus. The characteristics of the brightness of the displayed image are generally evaluated by luminance and a contrast ratio. The contrast ratio is a luminance ratio of white (maximum luminance) and black (minimum luminance). Since the black luminance is affected by the reflection of external light from an image screen, it is assumed below that the contrast ratio means a contrast ratio in an incident condition that external light incident on the image screen (bright place).

Furthermore, it is assumed that the contrast ratio in the bright place is the contrast ratio which is measured in a condition that external light of 150 lux is irradiated to the image screen at an angle of 45°.

The brightness and the contrast ratio of an image, which is displayed on the image screen and visually recognized by a viewer, depend not only on the level of luminance of the displayed image but also on the surface brightness of the display screen itself. That is, the brightness and the contrast ratio of the displayed image visually recognized by the viewer are determined by the balance between the sum total of the reflected lights when no image is displayed on the image screen, the visually recognized brightness of a fluorescent screen itself, and the like and the luminance of the displayed image which emits light by the fluorescent screen.

Then, the image display quality of a color image display apparatus can be improved by improving the brightness and the contrast ratio of the displayed image.

When the contrast ratio of the FED is improved, it is considered that the technique of the CRT, which has the same operation principle as that of the FED, can be used.

To improve the contrast ratio of the CRT, Japanese Patent Application Laid-Open Nos. 64-7457 and H07-179711 disclose a technique of using a color filter, which has the same color as that of a phosphor, between a substrate and a phosphor layer, the color filter having a function for causing the light emitted from the phosphor to selectively pass therethrough. Japanese Patent Application Laid-Open No. H09-27284 discloses a manufacturing method and like of a color filter of a plasma display. Furthermore, Japanese Patent Application Laid-Open No. 2000-164145 discloses a technique for providing a filter on a surface of a substrate to improve a contrast ratio of a CRT.

Japanese Patent Application Laid-Open No. 64-7457 discloses a color filter which is composed of pigment particles having an average particle diameter of 0.005 µm to 0.07 µm and which has a film thickness of 15 nm to 250 nm.

Furthermore, Japanese Patent Application Laid-Open No. 09-27284 discloses a technique of not only interposing a color filter between a phosphor and the substrate but also forming an external filter to the surface of the substrate (outer surface) opposite to the surface thereof on which the phosphor is formed (inner surface).

Japanese Patent Application Laid-Open No. 09-27284 discloses to form a color filter whose transmittance to a light having a wavelength within the range of the maximum spectrum wavelength of emitted lights ±20 nm is higher than the transmittance to a light having a wavelength of 400 to 650 nm other than the above range in the light emitted from a phosphor layer.

The external surface filter is a filter for supplementing the light absorption of the color filter and has a maximum absorption in a constant wavelength band other than the range of ±20 nm of the maximum spectrum wavelength of the light emitted by a three-color phosphor layer.

Japanese Patent Application Laid-Open No. H07-179711 discloses a pigment-dispersed liquid composition containing an inorganic pigment of 0.5 to 50 parts by weight, at least one kind of a dispersing agent selected from a group composed of sodium salt, ammonium salt or amine salt of acrylic resin, acrylic copolymer resin, polycarboxylic acids, and an aromatic sulfonic acid formalin condensate, and water or a solvent compatible with water. Furthermore, the publication discloses a method of manufacturing a color filter using the pigment-dispersed liquid composition.

Although the contrast ratio can be increased when the transmittance of a substrate to visible light is increased to about 50%, a halation is caused in a portion where a white display is made in contact with a black display. To prevent this phenomenon, Japanese Patent Application Laid-Open No. 2000-164145 discloses a technique for setting the transmittances of a substrate and a filter disposed to an outer surface of the substrate to 60 to 80%, respectively.

SUMMARY OF THE INVENTION

In the technique disclosed in Japanese Patent Application Laid-Open No. 2000-164145, since the transmittances are lowered, the white color luminance is deteriorated and thus the contrast ratio cannot be efficiently improved.

On the other hand, even the technique for interposing the color filter between the phosphor and the substrate disclosed in Japanese Patent Application Laid-Open Nos. S64-7457, H09-27284, and H07-179711 cannot avoid that the white luminance is lowered although it can improve the contrast ratio.

An object of the present invention is to improve a contrast ratio without lowering white luminance more than conventional white luminance.

There is provided a face panel for a color image display apparatus according to the present invention, comprising a transparent substrate, a plurality of phosphor layers disposed on the transparent substrate for emitting different color lights, and a plurality of transmittance adjustment layers interposed between the transparent substrate and the plurality of phosphor layers in correspondence to the plurality of phosphor layers, respectively, for adjusting the transmittances of the lights emitted from the plurality of phosphor layers, wherein, the transmittance adjustment layer has a filtering function having an approximately constant transmittance in the visible light wavelength region, and the transmittances of the plurality of transmittance adjustment layers are set to different values to the respective colors of the phosphor layers corresponding thereto.

Furthermore, there is provided a face panel for a color image display apparatus according to the present invention, comprising a transparent substrate, a plurality of phosphor layers disposed on the transparent substrate for emitting different color lights, and a plurality of transmittance adjustment layers interposed between the transparent substrate and the plurality of phosphor layers in correspondence to the plurality of phosphor layers, respectively, for adjusting the transmittances of the lights emitted from the plurality of phosphor layers, wherein, $$-0.01 < pX/(pX+pY+pZ) - xw < 0.01, \text{ and}$$

$$-0.015 < pY/(pX+pY+pZ) - yw < 0.015$$

are satisfied, when tristimulus values of emitted lights of red (R), green (G), and blue (B) phosphors are shown by R: (RX, RY, RZ), G: (GX, GY, GZ), B: (BX, BY, BZ), respectively, tristimulus values of the transmittances of the plurality of transmittance adjustment layers corresponding to the red (R), green (G), and blue (B) phosphors are shown by R: (Trx, Try, Trz), G: (Tgx, Tgy, Tgz), B: (Tbx, Tby, Tbz), respectively, a chromaticity coordinate of white light is shown by (xw, yw), and $$pX = RX \times Trx + GX \times Tgx + BX \times Tbx$$

$$pY = RY \times Try + GY \times Tgy + BY \times Tby$$

$$pZ = RZ \times Trz + GZ \times Tgz + BZ \times Tbz$$

are established, and wherein the transmittance adjustment layer has a filtering function having an approximately constant transmittance in the visible light wavelength region.

Furthermore, there is provided a panel for a color image display apparatus according to the present invention, comprising the face panel and a rear panel having electron emitting devices formed on a substrate, the face panel and the rear panel being disposed so that phosphor formed on the face panel is placed opposite the electron emitting device formed on the rear panel and bonded to each other.

Furthermore, there is provided a color image display apparatus according to the present invention, comprising the panel.

According to the present invention, a contrast ratio can be increased without decreasing luminance to a degree lower than the conventional luminance.

Further features of the present invention will become apparent from the following description of exemplary embodiments with reference to the attached drawings.

DESCRIPTION OF THE EMBODIMENTS

The inventors have found that a contrast ratio can be improved by introducing a transmittance adjustment layer, which has a filtering function having an approximately constant transmittance in a visible light wavelength region, between a phosphor layer and a transparent substrate in the visible light wavelength region.

The filtering function having the approximately contrast transmittance in the visible light wavelength region and a filter having the function will be called a neutral filtering function and a neutral filter below, respectively.

More specifically, because the transmittances of the transmittance adjustment layers are adjusted by the neutral filter containing a black pigment, the shapes of the spectra of the lights emitted from phosphors, which are transmitted to the substrate through the transmittance adjustment layers, are not changed. The transmittance can be adjusted without changing a film thickness by changing the content of black pigment. Furthermore, the transmittance adjustment layer may preferably have a so-called color filtering function for causing visible light to selectively pass therethrough.

Note that the same result can also be obtained by changing a film thickness or dispersing alumina or silica to the black pigment in addition to that the content of the black pigment is changed.

As a result, the transmittances of the transmittance adjustment layers can be adjusted so that a chromaticity coordinate of white light in a state in which the transmittance adjustment layers are not used becomes the same as that in a state in which the transmittance adjustment layers are provided. The contrast ratio can be improved by absorbing external light through the transmittance adjustment layers.

A first embodiment of the present invention is a face panel for a color image display apparatus having a transparent substrate, a plurality of phosphor layers disposed on the transparent substrate for emitting different color lights, and a plurality of transmittance adjustment layers interposed between the transparent substrate and the plurality of phosphor layers in correspondence to the plurality of phosphor layers, respectively, for adjusting the transmittances of the lights emitted from the plurality of phosphor layers, wherein the transmittance adjustment layer has a filtering function having an approximately constant transmittance in a visible light wavelength region.

The transmittance adjustment layer contains a black pigment, so that the filtering function having the approximately contrast transmittance in the visible light wavelength region is achieved. The transmittances can be adjusted by changing the content of the black pigment.

It is preferable to use manganese oxide, carbon black, black iron oxide, or titanium black as the black pigment. Furthermore, the transmittance adjustment layer may preferably contain a pigment which causes the light emitted from phosphor formed on the transmittance adjustment layer to selectively pass therethrough.

A region in which the transmittance adjustment layer is formed may be preferably composed of a region in which a pattern containing a black pigment is formed and a region in which the pattern is not formed. In this case, a layer, which has a filtering function for causing the light emitted from phosphor formed on the transmittance adjustment layer to selectively pass therethrough, may be preferably formed on the region in which the pattern containing the black pigment is not formed.

According to the embodiment, it is preferable to provide the transmittance adjustment layer having the neutral filtering function containing the black color pigment as a filter of the phosphor layer composed of phosphors having a high luminescence efficiency. As a result, it is possible to keep the luminance of a white display as well as to reduce the reflectance of external light and to improve the contrast ratio by providing the layers with which the black color pigment is mixed.

A glass substrate composed of a glass material such as soda glass, borosilicate glass, and the like can be used as the transparent substrate as long as it is transparent in the visible light wavelength region. The glass material is not limited to the above material as long as it is transparent in the visible light wavelength region. Note that the material of the transparent substrate is not limited to the glass material. A substrate composed of other material such as a resin and the like may be preferably used as the transparent substrate as long as it is a material which is transparent in the visible light wavelength region and does not damage the substrate by the manufacturing condition thereof.

A first embodiment of the present invention will be described below using schematic sectional views of FIGS. 5A to 5D showing arrangements of phosphor layers and transmittance adjustment layers.

Figure 5A:
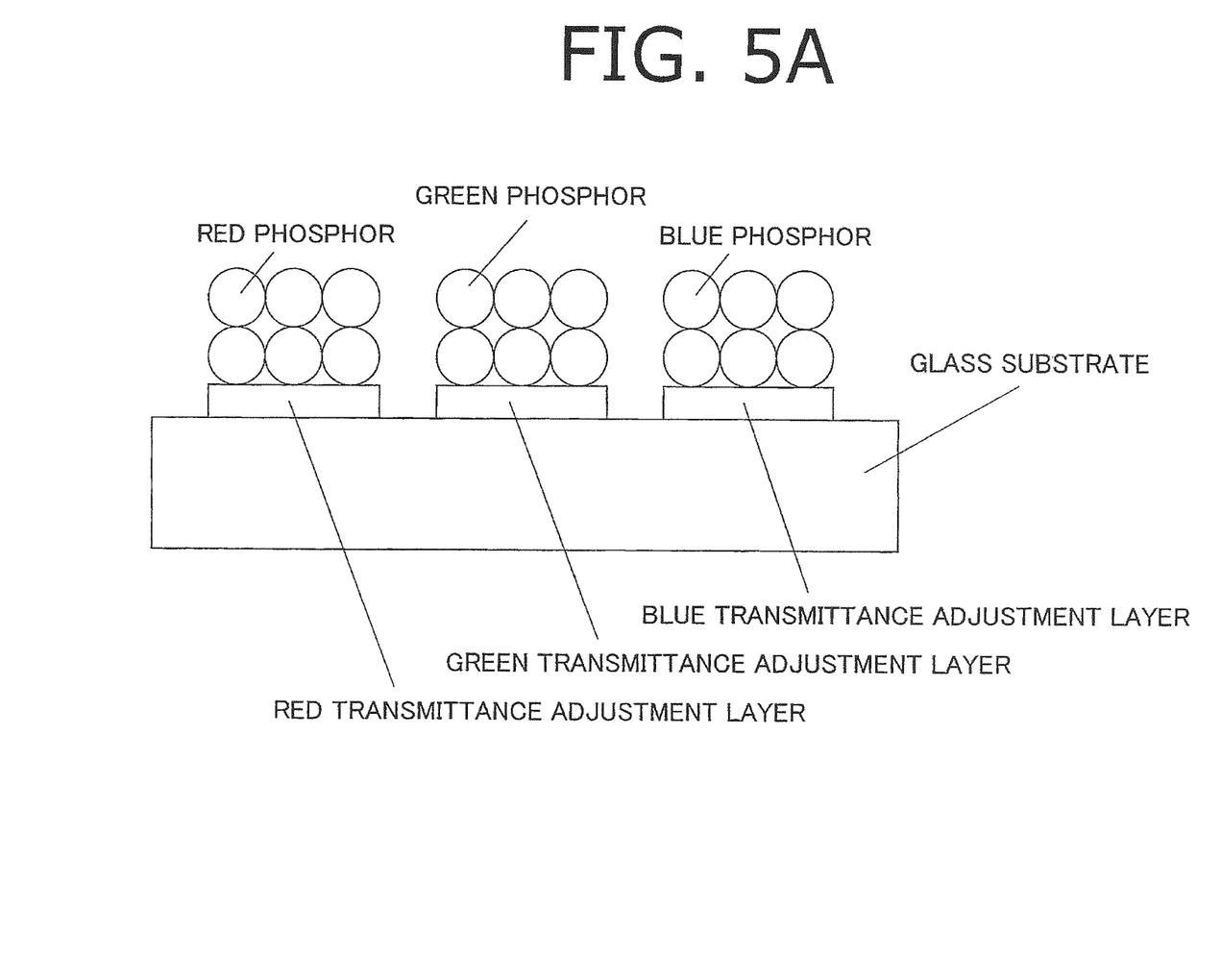
FIGS. 5A to 5D are views describing transmittance adjustment layers of the present invention.
Figure 5B:
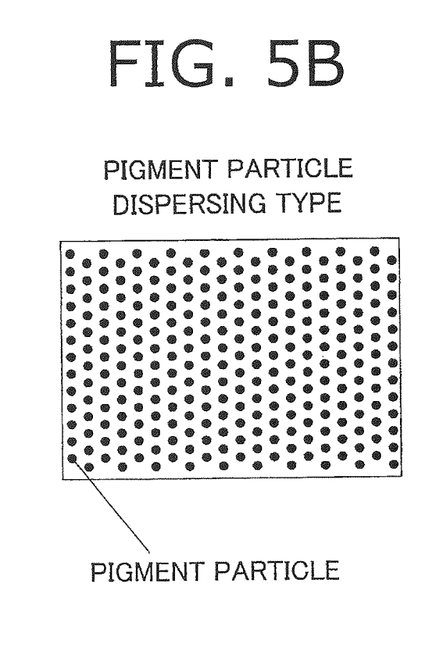
Figure 5C:
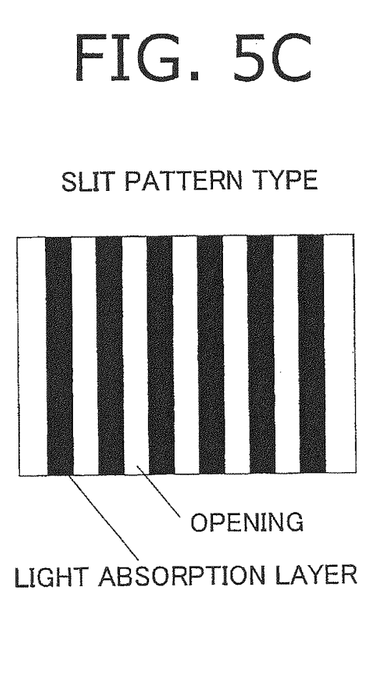
Figure 5D:
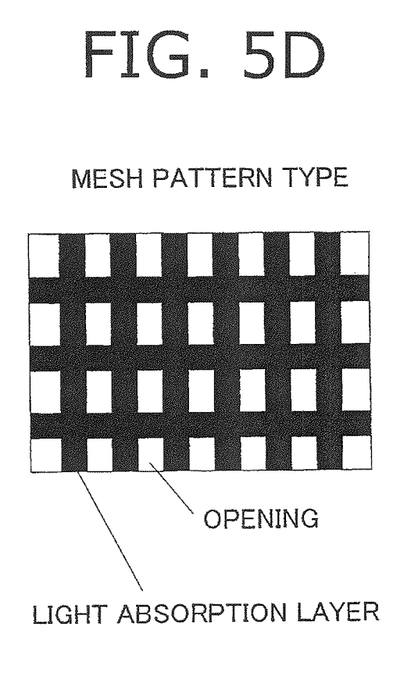

As shown in FIG. 5A, red, green, and blue phosphor particles are disposed on a glass substrate, which is a transparent substrate in the visible light wavelength region, in a predetermined pattern in a layer state, and transmittance adjustment layers corresponding to the respective colors are interposed between the respective color phosphor layers and the glass substrate. In the FIG. 5A, although the transmittance adjustment layers are disposed in correspondence to all the phosphor layers, they may need not be disposed to a phosphor having a low luminescence efficiency.

Any material may be preferably used as a material constituting the phosphor layers as long as it emits a desired color light by being excited by the electrons emitted from an electron emitting device.

For example, $Y_2O_3$:Eu, $Y_2O_2$S:Eu, and the like can be used as a red emission phosphor. ZnS:CuAuAl, ZnS:CuAl, $SrGa_2S_2$:Eu, and the like can be used as a green emission phosphor, and ZnS:AgAl, ZnS:AgCl, and the like can be used as a blue luminescence phosphor.

The film thicknesses of the phosphor layers are determined by the particle diameter of the phosphors, the acceleration voltage of an electron beam, and the like and are preferably approximately 2 to 2.5 times larger than that of the particle diameter.

A pigment particle dispersing type (FIG. 5B), a slit pattern type (FIG. 5C), a mesh pattern type (FIG. 5D), and the like are available as the transmittance adjustment layers corresponding to the respective color phosphor layers.

In pigment particle dispersing type transmittance adjustment layers, fine pigment particles having a particle diameter of several nanometers are uniformly dispersed on a material acting as a dispersion agent. On the other hand, in slit pattern type or a mesh pattern type transmittance adjustment layers, the transmittance adjustment layers are composed of light absorption pattern portions composed of light absorption layers, in which fine particles having a particle diameter of several nanometers are uniformly dispersed on a material acting as a dispersion agent, and openings.

In the pigment particle dispersing type transmittance adjustment layers, a transmittance can be adjusted by the content of a pigment. On the other hand, in the slit pattern type or in the mesh pattern type transmittance adjustment layers, a light transmittance can be adjusted from the area ratio of the light absorption pattern portions and the openings.

The transmittance adjustment layer preferably has a neutral filtering function having a constant transmittance in the visible light wavelength region as optical characteristics. Furthermore, the transmittance adjustment layer may preferably have a color filtering function for causing the light emitted from the phosphor layer to selectively pass therethrough.

In order for the transmittance adjustment layer to has the neutral filtering function, in the pigment particle dispersion type transmittance adjustment layer, the transmittance may be preferably adjusted by changing the content of a black pigment dispersed in a resin having a constant transmittance in the visible light wavelength region.

In the slit pattern type or mesh pattern type transmittance adjustment layers, a material in which a black pigment is contained in a resin likewise the pigment particle dispersion type transmittance adjustment layers may be used as the light absorption layers. However, since the transmittance is adjusted by the areas of the light absorption layers and the openings, the light absorption layers are preferably layers through which light does not pass. This state can be easily achieved by increasing the amount of the black pigment dispersed in the resin.

Furthermore, the shapes of the light absorption pattern portions and the openings may preferably have patterns other than the slit and mesh pattern.

Manganese oxide, carbon black, black iron oxide, or titanium black can be used as the black pigment.

In order for the transmittance adjustment layer to have the color filtering function, pigment particles for the color filter and the black pigment may be preferably dispersed on the resin in the pigment particle dispersion type transmittance adjustment layer. In the pattern type transmittance adjustment layers, the light absorption pattern portions may be preferably formed of a material in which the black pigment is dispersed in the dispersion agent and color filters may be preferably formed at the openings. Furthermore, a color filter layer may be preferably formed on the substrate, and the light absorption pattern portions may be formed on the color filters. Otherwise, the light absorption pattern portions may be formed on the substrate, and color filter layers may be preferably formed on the light absorption pattern portions.

As pigments used in the color filters, $Fe_2O_3$, $MnO_2$, and the like may be used as a red color filter, $(Co, Ni, Zn)_2TiO_4$ and the like may be used as a green color filter, and $Al_2O_3 \cdot CoO$ and the like may be used as a blue color filter. However, the pigments are not limited thereto.

Furthermore, when tristimulus values of emitted lights of red (R), green (G), and blue (B) phosphors are shown by R: (RX, RY, RZ), G: (GX, GY, GZ), B: (BX, BY, BZ), respectively, tristimulus values of the transmittances of transmittance adjustment layers corresponding to the red (R), green (G), and blue (B) phosphors are shown by R:(Trx, Try, Trz), G:(Tgx, Tgy, Tgz), B:(Tbx, Tby, Tbz), respectively, a chromaticity coordinate of white light is shown by (xw, yw), and $$pX = RX \times Trx + GX \times Tgx + BX \times Tbx$$
$$pY = RY \times Try + GY \times Tgy + BY \times Tby$$
$$pZ = RZ \times Trz + GZ \times Tgz + BZ \times Tbz$$

are established, the inventors have found as a second embodiment that a contrast ratio can be more improved by adjusting the transmittances of transmittance adjustment layers so that the following expressions are satisfied.

$$-0.01 < pX/(pX+pY+pZ) - xw < 0.01$$

$$-0.015 < pY/(pX+pY+pZ) - yw < 0.015$$

Here, it is preferable that the transmittance adjustment layers are neutral filters having a constant transmittance in the visible light wavelength region.

When the chromaticity coordinate of white light (xw, yw) is displayed in the case of the value of pX/(pX+pY+pZ)−xw being −0.01 or less or 0.01 or more, it is necessary to attenuate light of red or blue. Accordingly, the contrast ratio, i.e., the ratio of the white luminance composed of the light of red, green, blue and the luminance when light is not emitted (black) is lowered 10% or more than a case in which the light of the respective colors is not attenuated.

When the value of pY/(pX+pY+pZ)−yw<0.015 is −0.015 or less or 0.015 or more, the contrast ratio is also lowered about 10% or more.

Therefore, it is necessary that the values of Trx, Try, Trz, Tgx, Tgy, Tgz, Tbx, Tby, Tbz satisfy the range of −0.01<pX/(pX+pY+pZ)−xw<0.01 and the range of −0.015<pY/(pX+pY+pZ)−yw<0.015 at the same time.

When the transmittances Trx, Try, Trz, Tgx, Tgy, Tgz, Tbx, Tby, Tbz of the transmittance adjustment layers are within the ranges that satisfy the above condition, the transmittance adjustment layers may be preferably either of the pigment particle dispersion type transmittance adjustment layers or the pattern type transmittance adjustment layers.

When transmittance adjustment layers, which are within the ranges in which Trx, Try, Trz, Tgx, Tgy, Tgz, Tbx, Tby, Tbz satisfy both expressions at the same time, are introduced, the contrast ratio can be improved 50% or more than in a case in which they are not introduced. Furthermore, the contrast ratio can be improved about 10% or more than a system for introducing conventionally used color filters.

The transmittance adjustment layer contains a black pigment, so that the neutral filtering function having the approximately constant transmittance in the visible light wavelength region is achieved. Manganese oxide, carbon black, black iron oxide or titanium black is preferably used as the black pigment.

The region in which the transmittance adjustment layer is formed may be preferably composed of the region in which the pattern containing the black pigment is formed and the region in which the pattern is not formed.

In FED, the chromaticity coordinate of white light (xw, yw) is displayed by reducing extra light from the sum total of the respective emission colors by reducing an emission time, and the like. However, luminance is lowered by the luminance of the amount of light reduced from the sum total of the emission luminances of the respective colors.

On the other hand, in the embodiment of the present invention, when white is displayed, the emission time need not be reduced because the sum total of the emission luminances of the respective colors is previously set by the transmittance adjustment layers introduced to the respective colors so that the sum total becomes the white luminance which is the same as that when the emission time is reduced.

Furthermore, since an external light is absorbed by the transmittance adjustment layers, the contrast ratio can be improved by lowering an external light reflectance. From these effects, the contrast ratio can be further improved by improving the external light reflectance while keeping white luminance.

A panel for an image display apparatus comprising the face plate of the present invention and a rear panel having electron emitting devices formed on a substrate, the face panel and the rear panel being disposed so that the phosphor formed on the face plate is placed opposite the electron emitting device formed on the rear panel, can be achieved.

Furthermore, an image display apparatus comprising the panel can be achieved.

EXAMPLES

The present invention will be described below in more detail using examples. Note that the examples and modified examples described below relate to a case that tristimulus values (RX, RY, RZ) for causing red (R) light to emit are (281.9, 162.9, 20.5), tristimulus values (GX, GY, GZ) for causing green (G) light to emit are (187.4, 408.9, 102.2), and tristimulus values (BX, BY, BZ) for causing blue (B) light to emit are (221.2, 82.3, 1167.5).

Example 1

Figure 1:
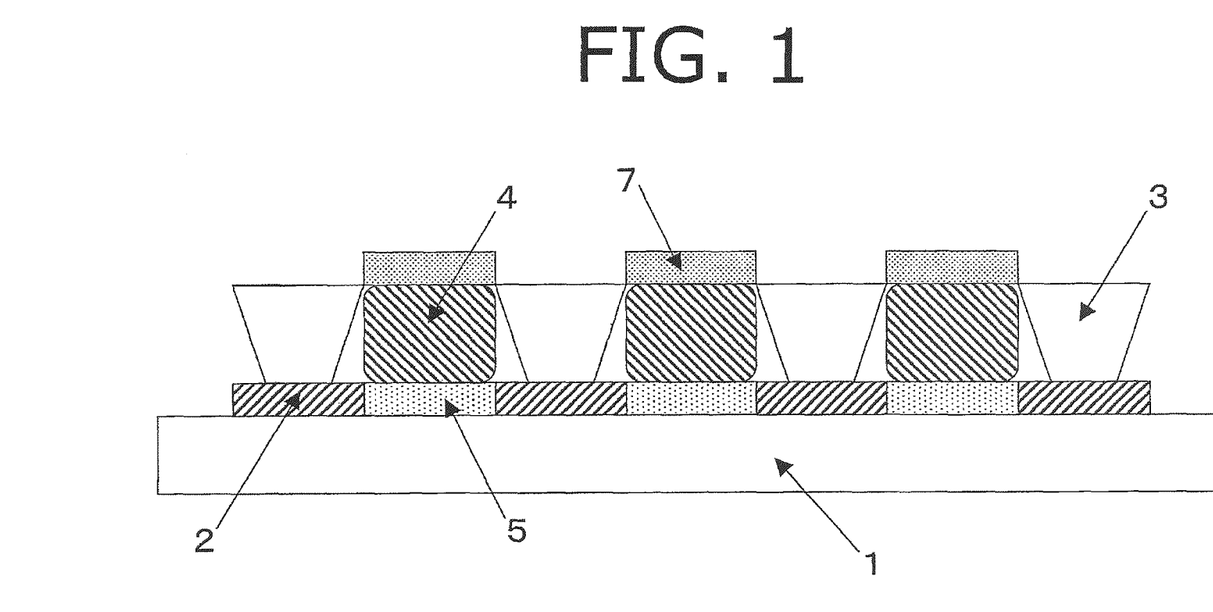
FIG. 1 is a sectional view of a structure of a front panel of an image display apparatus.

In an example 1, the invention according to the first embodiment of the present invention will be described using a schematic sectional view of a face panel of FIG. 1. In the face panel shown in FIG. 1, a black matrix (light absorption layer) 2 having a film thickness of 1 μm is formed on a glass substrate 1, and transmittance adjustment layers 5 having a film thickness of 2 μm are disposed to a region surrounded by the black matrix 2.

Furthermore, resistance material layers 3 having a film thickness of 13 mm are formed on the black matrix 2, and phosphor layers 4 for emitting red, green, and blue lights are disposed to the transmittance adjustment layers 5. Metal back layers 7 are formed on the phosphor layers 4.

Figure 2:
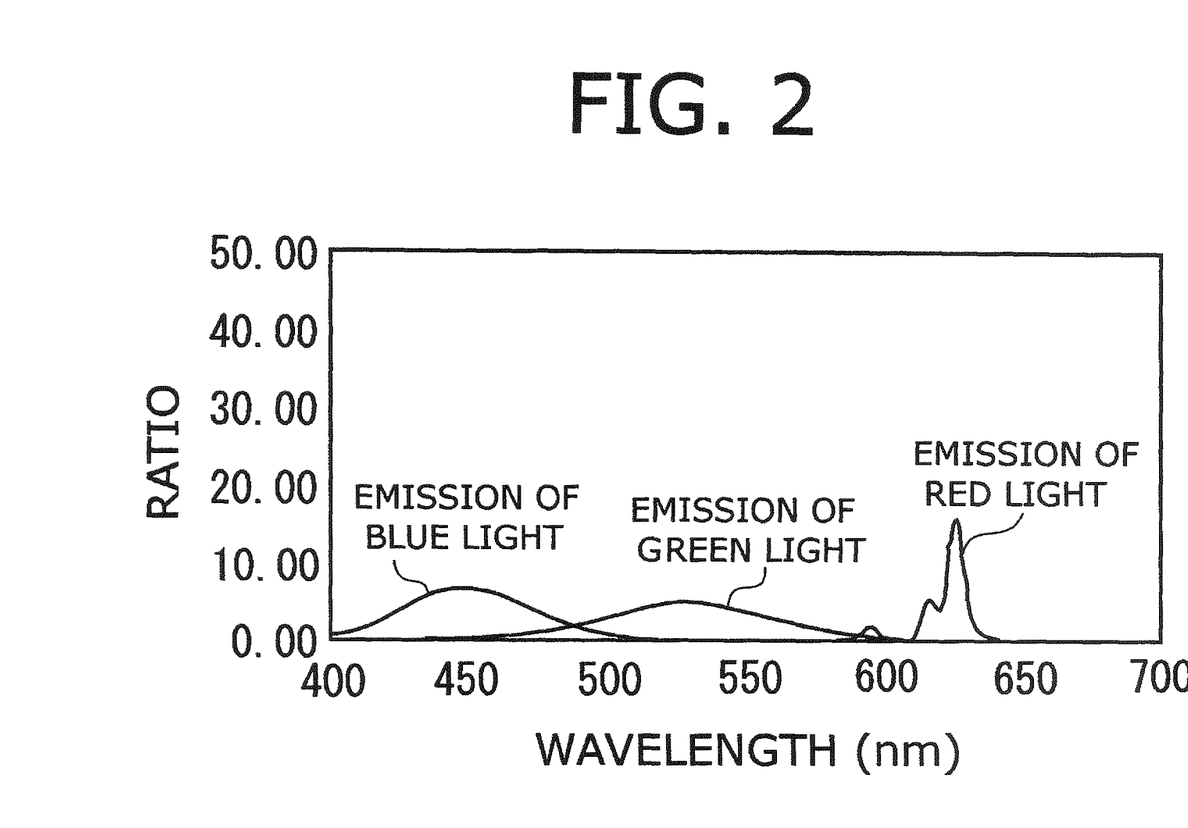
FIG. 2 is a graph showing peak luminance emission ratios of the respective colors of phosphors.

FIG. 2 is a graph showing the spectra of lights emitted from phosphors ordinarily used for an electron beam emission type image display apparatus. Here, $Y_2O_3$:Eu is used as a red phosphor, ZnS:CuAuAl is used as a green phosphor, and ZnS:AgAl is used as a blue phosphor.

In the spectra of the emission luminances of FIG. 2, when lights are emitted without passing through color filters, a white balance is achieved by adjusting the luminescence of the other colors based on a spectrum of Green having a lowest height. When the chromaticity coordinate of white light is set to (0.272, 0.279) and the luminescence of green is set to 100%, a white balance can be achieved by adjusting a drive condition so that red light is emitted in an amount of 46% and blue light is emitted in an amount of 70%.

When the transmittance adjustment layer has only the neutral filtering function, the same white balance as that when the drive condition is adjusted can be achieved even if the drive condition is not adjusted by adjusting the transmittance of the transmittance adjustment layer corresponding to the red phosphor to 46% and the transmittance of the transmittance adjustment layer corresponding to the blue phosphor to 70%.

For example, pigment particle dispersing type transmittance adjustment layers may be preferably interposed between the red and blue phosphor layers 4 and the glass substrate 1.

In the example, it is assumed that a neutral filtering function acting as the transmittance adjustment layers of the present invention is added to color filters corresponding to the red, green, and blue phosphors.

Even if the color filters are employed, the luminances of the lights emitted from the red and blue phosphors are higher than that of the light emitted from the green phosphor. Thus, the black pigment, which acts as a filter for lowering a transmittance in the overall wavelength region of visible light, is mixed to the color filter layers 5 corresponding to the red and blue phosphors having a high luminescence efficiency.

The color filter is a layer having a function for causing the light emitted from the phosphor to selectively pass therethrough, and a red color filter contains a red pigment, and a blue color filter contains a blue pigment.

A manganese oxide pigment, carbon black, black iron oxide, titanium black, or the like, which does not affect the light emitted from a phosphor, can be used as the black pigment. In the example, the manganese oxide pigment is selected.

Figure 3:
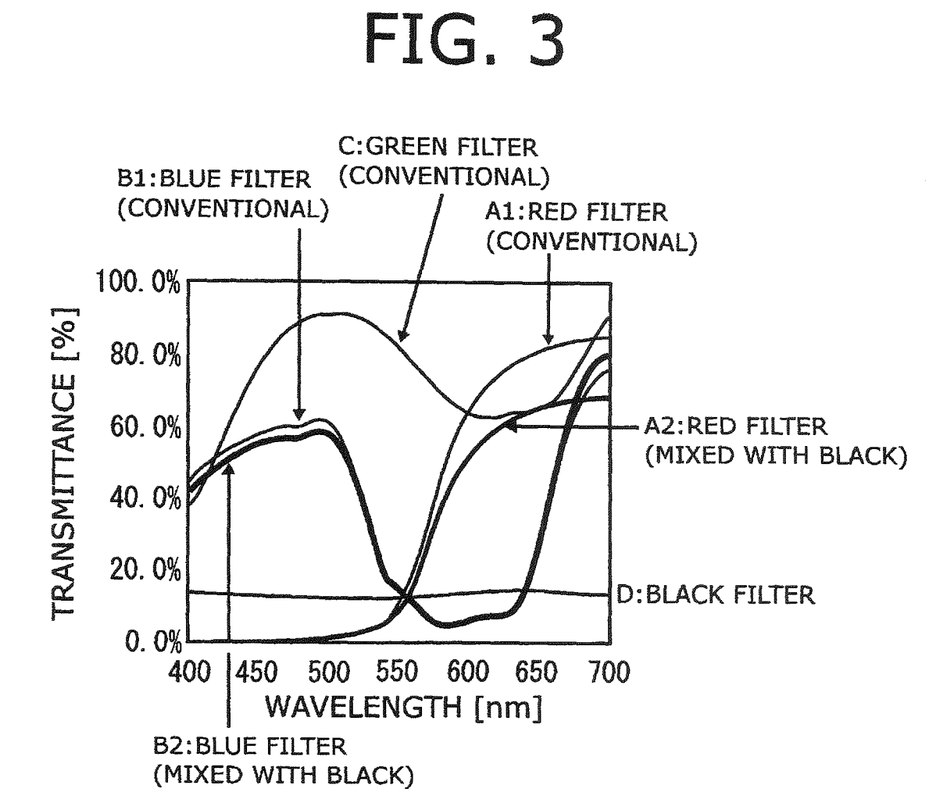
FIG. 3 is a graph showing transmittances of color filters.

FIG. 3 shows the wavelength dependencies of the transmittances of a conventionally used color filter, red and blue filters mixed with the black pigment described above, and a black filter containing only the black pigment.

As shown in FIG. 3, the black filter containing only the black pigment has an approximately constant transmittance in the visible light wavelength region (region from a wavelength of 400 nm to a wavelength of 700 nm). Although manganese oxide is used as the black pigment in FIG. 3, a similar result can be obtained even if carbon black, black iron oxide, or titanium black is used.

Note that the transmittance of the black filter can be also changed by the content of the black pigment likewise the color filters.

Figure 4A:
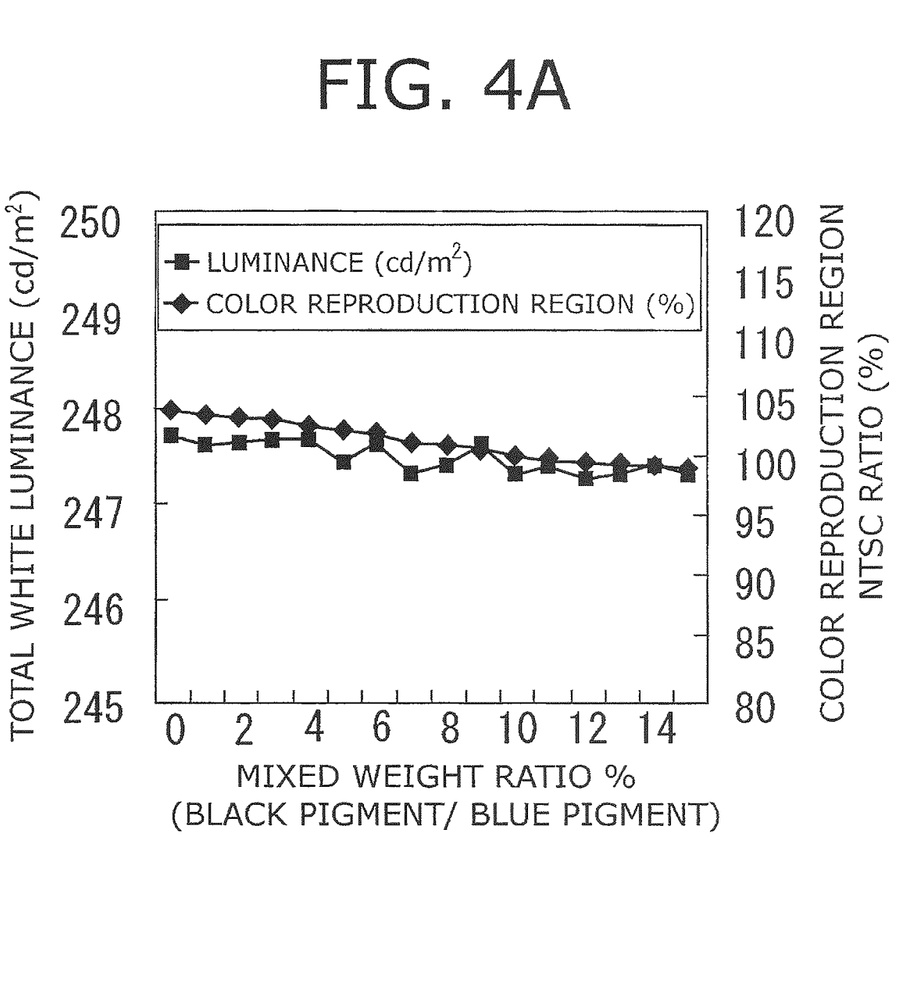
FIGS. 4A and 4B are graphs showing the relation among a mixing ratio of a black pigment to a pigment, all the white luminances, and a color reproduction region.
Figure 4B:
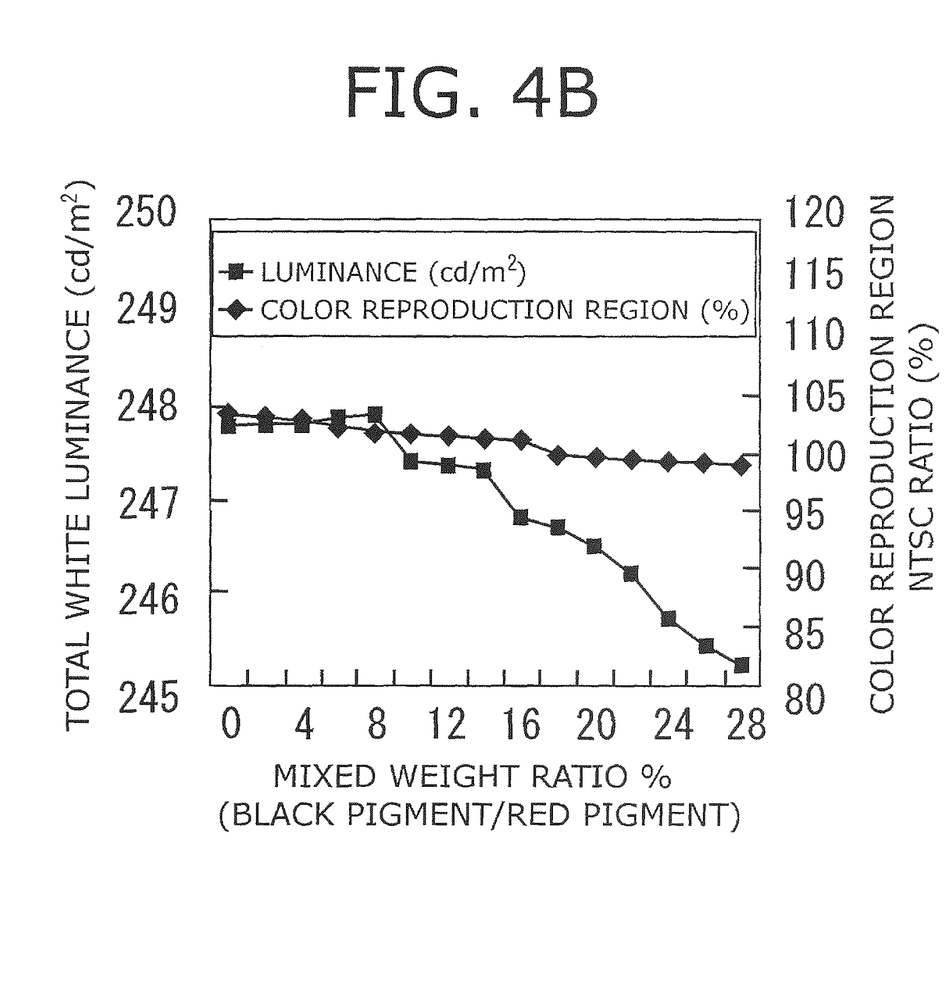

FIGS. 4A and 4B are graphs showing the changes of the luminance and the color reproducibility of white to the mixing ratio of a red or blue pigment and a black pigment when pigment particle dispersing type transmittance adjustment layers (red and blue color filters mixed with the black pigment) are interposed between the red and blue phosphor layers 4 and the glass substrate 1. FIGS. 4A and 4B show an example in which ($Al_2O_3 \cdot CoO$) cobalt aluminate is used as the blue pigment and a ($Fe_2O_3$) colcothar red pigment is used as the red pigment.

Note that a color filter, which is composed of $(Co, Ni, Zn)_2TiO_4$ and does not contain the black pigment, is used as the green transmittance adjustment layer.

It can be found from FIG. 4A that it is appropriate to set the mixing weight ratio of the black pigment to the blue pigment to 1% in the blue transmittance adjustment layer because an increase of the mixing weight ratio of the black pigment to the blue pigment lowers the overall white luminance and also deteriorates a color reproduction region. On the other hand, it can be found from FIG. 4B that it is appropriate to set the mixing weight ratio of the black pigment to the red pigment to about 10% at a maximum in the red transmittance adjustment layers because the overall white luminance is not lowered and the color reproducibility is not deteriorated until the mixing weight ratio becomes 10%.

In the example, the mixing weight ratio of the black pigment to the blue pigment is set to 3% and the mixing weight ratio of the black pigment to the red pigment is set to 13%.

Note that the conventional green color filter, which does not contain the black pigment, is used as the green transmittance adjustment layer.

Since the red and blue color filters each mixed with the black pigment are used as the transmittance adjustment layers, the external light reflectance is lowered without deteriorating the white luminance, and thus the contrast ratio can be improved.

When the white luminance of the image display apparatus using the face plate of the example was measured, the white luminance was 101%, the external light reflectance was 87%, and the contrast ratio was improved about 20%, as compared with a conventional technique (corresponding to a comparative example 1) provided only with color filters.

Note that the white value of the example is set so that the chromaticity coordinate of white light becomes (0.272, 0.279).

Note that although the pigment particle dispersing type transmittance adjustment layers are used in the example, a slit type or matrix type transmittance adjustment layers may be used as described later.

Furthermore, transmittance adjustment layers in which only the black pigment is dispersed may be used without using the color filters.

The second embodiment of the present invention will be described below in more detail using examples 2 and 3.

Example 2

Since a construction and a manufacturing method of a face panel are the same as those of the example 1, explanation thereof is omitted.

In the example, pigment particle dispersing type neutral filters are used which employ carbon black shown in Table 1 as a transmittance adjustment material (black pigment) for adjusting the transmittances of transmittance adjustment layers. Phosphors shown in Table 1 are used as the phosphors of respective colors.

As shown in Table 2; the contents of the black pigment are adjusted so that a red transmittance adjustment layer (transmittance adjustment layer corresponding to a red phosphor) has a transmittance of 70%, a green transmittance adjustment layer has a transmittance of 80%, and a blue transmittance adjustment layer has a transmittance of 60%. Since the detail of the contents of the black pigment are omitted because they also relate to the film thicknesses of the transmittance adjustment layers. Note that, in the example, the film thicknesses of the transmittance adjustment layers are set to the same thicknesses as those of the example 1.

White luminance (a chromaticity coordinate of white light was (0.272, 0.279)), an external light reflectance when light is not emitted, and a contrast ratio were measured using an image display apparatus employing the face panel. A result of measurement (Table 2) is shown by relative values to a result of measurement of a comparative example 2 to be described later which is provided with neither transmittance adjustment layers nor color filter layers.

Since the example uses neutral filters as the transmittance adjustment layers, pX, pY, pZ are the same as the transmittances of red, green, and blue transmittance adjustment layers, and pX/(pX+pY+pZ) and pY/(pX+pY+pZ)−yw are 0.000, −0.001, respective as shown in Table 3.

TABLE 1

| | Transmittance adjustment layer material | Phosphor material |
|---|---|---|
| Red | Carbon black | $Y_2O_2S:Eu$ |
| Green | Carbon black | ZnS:CuAl |
| Blue | Carbon black | ZnS:AgAl |

TABLE 2

| | Transmittance adjustment layer | | | White luminance | External light reflection | Contrast |
|---|---|---|---|---|---|---|
| Red | Trx 70% | Try 70% | Trz 70% | 81% | 53% | 152% |
| Green | Tgx 80% | Tgy 80% | Tgz 80% | | | |
| Blue | Tbx 60% | Tby 60% | Tbz 60% | | | |

TABLE 3

| | | pX/(pX + pY + pZ) − xw |
|---|---|---|
| pX | 70% | 0.000 |
| pY | 75% | pY/(pX + pY + pZ) − yw |
| pZ | 62% | −0.001 |

Example 3

Although the pigment particle dispersing type transmittance adjustment layers are used in the example 2, slit pattern type transmittance adjustment layers are used in an example 3. The widths of openings and pattern portions are determined so that the transmittances of the slit pattern type transmittance adjustment layers are the same as those of the example 2. Table 5 shows the determined widths of the openings and the pattern portions. A light absorption layer material (black pigment) and phosphors are the same as those of the example 2 as shown in Table 4. The transmittances of the transmittance adjustment layers corresponding to the respective phosphors are the same as those of the example 2.

Table 5 shows a result of measurement when white luminance (a chromaticity coordinate of white light was (0.272, 0.279)), an external light reflectance when light was not emitted, and a contrast ratio were measured using an image display apparatus using the face panel. The result of measurement shown in Table 5 is shown by the relative values to the result of measurement of the comparative example 2 to be described later which is provided with neither the transmittance adjustment layers nor the color filter layers.

Since the example also uses neutral filters as the transmittance adjustment layers, pX, pY, pZ are the same as the transmittances of red, green, and blue transmittance adjustment layers, and pX/(pX+pY+pZ) and pY/(pX+pY+pZ)−yw are 0.000, −0.001, respectively, as shown in Table 6.

TABLE 4

| | Light absorption layer material | Phosphor material |
|---|---|---|
| Red | Carbon black | $Y_2O_2S:Eu$ |
| Green | Carbon black | ZnS:CuAl |
| Blue | Carbon black | ZnS:AgAl |

TABLE 5

| | Pattern width (light absorption layer/opening) | White luminance | External light reflection | Contrast |
|---|---|---|---|---|
| Red | 15 μm/35 μm | 81% | 53% | 152% |
| Green | 10 μm/40 μm | | | |
| Blue | 20 μm/30 μm | | | |

TABLE 6

| | | pX/(pX + pY + pZ) − xw |
|---|---|---|
| pX | 70% | 0.000 |
| pY | 75% | pY/(pX + pY + pZ) − yw |
| pZ | 62% | −0.001 |

Comparative Example 1

In the comparative example 1, ordinary color filters are formed between a glass substrate and phosphor layers in place of transmittance adjustment layers.

Materials shown in Table 7 are used as color filter materials and phosphors dispersed on red, green and blue color filters.

Table 8 shows tristimulus values of the transmittances of the color filter layers.

Table 8 shows a result of measurement when white luminance (a chromaticity coordinate of white light is (0.272, 0.279)), an external light reflectance when light was not emitted, and a contrast ratio were measured using an image display apparatus using the face panel. The result of measurement shown in Table 8 is shown by relative values to the result of measurement of the comparative example 2 to be described later which is provided with neither transmittance adjustment layers nor color filter layers. Table 9 shows the values of pX, pY, pZ, pX/(pX+pY+pZ), and pY/(pX+pY+pZ)−yw at the time.

TABLE 7

| | Color filter material | Phosphor material |
|---|---|---|
| Red | $Fe_2O_3$ | $Y_2O_2S:Eu$ |
| Green | $(Co, Ni, Zn)_2TiO_4$ | ZnS:CuAl |
| Blue | $Al_2O_3 \cdot CoO$ | ZnS:AgAl |

TABLE 8

| | Color filter | | | White luminance | External light reflection | Contrast |
|---|---|---|---|---|---|---|
| Red | Trx 76% | Try 70% | Trz 22% | 79% | 56% | 139% |
| Green | Tgx 59% | Tgy 70% | Tgz 63% | | | |
| Blue | Tbx 67% | Tby 70% | Tbz 84% | | | |

TABLE 9

| | | pX/(pX + pY + pZ) − xw |
|---|---|---|
| pX | 68% | −0.034 |
| pY | 70% | pY/(pX + pY + pZ) − yw |
| pZ | 82% | −0.048 |

Comparative Example 2

The comparative example 2 is a face panel which is not provided with color filters different from the comparative example 1.

Table 10 shows phosphors used in the comparative example 2. White luminance (a chromaticity coordinate of white light was (0.272, 0.279)), an external light reflectance when light was not emitted, and a contrast ratio are measured using an image display apparatus employing the face panel. The white luminance, the external light reflectance, and the contrast ratio in the comparative example 2 are set to 100% so that they are used as standards of the examples and the comparative example 1.

Since the comparative example 2 is not provided with the transmittance adjustment layers, pX, pY, and, pZ become 100%, and pX, pY, pZ, pX/(pX+pY+pZ) and pY/(pX+pY+pZ)−yw become −0.010, −0.031, respectively, as shown in Table 12.

TABLE 10

| | Phosphor material |
|---|---|
| Red | $Y_2O_2S:Eu$ |
| Green | ZnS:CuAl |
| Blue | ZnS:AgAl |

TABLE 11

| | Transmittance adjustment layer | | | White luminance | External light reflection | Contrast |
|---|---|---|---|---|---|---|
| Red | Trx | Try | Trz | 100% | 100% | 100% |
| | None (100%) | | | | | |
| Green | Tgx | Tgy | Tgz | | | |
| | None (100%) | | | | | |
| Blue | Tbx | Tby | Tbz | | | |
| | None (100%) | | | | | |

TABLE 12

| | | pX/(pX + pY + pZ) − xw |
|---|---|---|
| pX | 100% | −0.010 |
| pY | 100% | pY/(pX + pY + pZ) − yw |
| pZ | 100% | −0.031 |

From what has been described above, in the present invention, the contrast ratio and the image quality can be improved without lowering luminance as compared with a conventional technique.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-219860, filed on Aug. 28, 2008, which is hereby incorporated by reference herein in its entirety.

What is claimed is:

1. A display panel comprising;
a face plate which includes a transparent substrate, a plurality of phosphor layers for emitting different color lights, and a plurality of transmittance adjustment layers, each transmittance adjustment layer corresponding to each of the phosphor layers, for adjusting the transmittances of the lights emitted from the plurality of phosphor layers, the plurality of phosphor layers being disposed on the plurality of transmittance adjustment layers, and the plurality of transmittance adjustment layers being disposed on the transparent substrate, wherein the transmittance adjustment layer has a filtering function having an approximately constant transmittance in the visible light wavelength region, and
a rear plate having a plurality of display elements each corresponding to each phosphor layer,
wherein the face plate and the rear plate are disposed so that the phosphor layers formed on the face plate are opposite to the display elements formed on the rear plate.

2. The display panel according to claim 1, wherein the transmittances of the plurality of transmittance adjustment layers are set to different values to the respective colors of the phosphor layers corresponding thereto.

3. The display panel according to claim 1, wherein the transmittance adjustment layer contains a black pigment so that the filtering function having the approximately constant transmittance in the visible light wavelength region is achieved.

4. The display panel according to claim 3, wherein the black pigment is manganese oxide, carbon black, black iron oxide, or titanium black.

5. A display panel comprising;
a face plate which includes a transparent substrate, a plurality of phosphor layers for emitting different color lights, and a plurality of color filter layers, each color filter layer corresponding to each of the phosphor layers, the plurality of phosphor layers being disposed on the plurality of color filter layers, and the plurality of color filter layers being disposed on the transparent substrate, wherein the color filter layer contains a black pigment for lowering a transmittance in the overall wavelength region of visible light and adjusting the transmittances of the lights emitted from the plurality of phosphor layers, and
a rear plate having a plurality of display elements each corresponding to each phosphor layer,
wherein the face plate and the rear plate are disposed so that the phosphor layers formed on the face plate are opposite to the display elements formed on the rear plate.

6. The display panel according to claim 5, wherein the color filter layer contains a pigment for causing the light emitted from the phosphor formed on the color filter layer to selectively pass therethrough.

7. The display panel according to claim 6, wherein the pigment is one of red color pigment, blue color pigment and green color pigment.

* * * * *